United States Patent [19]

Sato et al.

[11] Patent Number: 4,626,568

[45] Date of Patent: Dec. 2, 1986

[54] VIBRATION AND NOISE INSULATING RUBBER COMPOSITIONS

[75] Inventors: Kyosaku Sato; Richard W. Liu; Seung-Tong Cheung, all of Sarnia, Canada

[73] Assignee: Polysar Limited, Sarnia, Canada

[21] Appl. No.: 763,694

[22] Filed: Aug. 8, 1985

[51] Int. Cl.$^4$ .......................... C08K 3/20; C08K 3/10; C08K 5/01; C08L 33/02

[52] U.S. Cl. .................................... 524/526; 524/432; 524/433; 524/519; 524/522

[58] Field of Search ............... 524/432, 433, 526, 519, 524/522

[56] References Cited

U.S. PATENT DOCUMENTS 4,391,942   7/1983   Nakauchi et al. ................... 524/526

OTHER PUBLICATIONS

Chemical Abstracts 1984–vol. 100, 122598e.
Chemical Abstracts 1984–vol. 100, 158039n.
Chemical Abstracts 1985–vol. 102, 133389e.

Primary Examiner—Herbert J. Lilling
Attorney, Agent, or Firm—Stevens, Davis, Miller & Mosher

[57] ABSTRACT

Rubber compositions are provided comprising per 100 parts by weight from about 65 to about 97 parts by weight of at least one rubber selected from the group consisting of natural rubber, synthetic cis-1,4-isoprene rubber, cis-1,4-butadiene rubber and brominated butyl rubber, and from about 3 to about 35 parts by weight of at least one carboxylated rubber selected from the group consisting of carboxylated styrene-butadiene rubber, carboxylated butadiene rubber, carboxylated isoprene rubber and carboxylated natural rubber, from about 20 to about 60 parts by weight per 100 parts by weight of rubbers of carbon black, from about 3 to about 25 phr of process oil and from about 1 to about 10 parts by weight per 100 parts by weight of rubber of metal oxide. The compositions are vulcanizable and the vulcanizates exhibit a good combination of vibration damping and noise insulating properties and are suitable for automotive engine mounts.

5 Claims, No Drawings

VIBRATION AND NOISE INSULATING RUBBER COMPOSITIONS

BACKGROUND OF THE INVENTION

This invention relates to rubber compositions having vibration damping and noise insulating properties, and being suitable for use as engine mounts.

The function of engine mounts is to insulate the transmission of vibration from the engine to the frame and passenger compartment of an automobile. The operating temperature of the engine mount can vary in the range from about 25° C. to about 80° C. Therefore, materials having relatively high damping coefficients in this temperature range are desired for engine mount applications. The materials used for engine mounts should also have, preferably, noise insulating properties. Engine vibration is particularly troublesome in the low frequency region (10–20 Hz) while the high frequency region (above 75 Hz) contributes to the generation of noise in the passenger compartment.

It is desirable that the damping coefficient of the composition (also referred to as tan delta), which is indicative of the vibration damping character of the composition, be relatively high (i.e. highly absorbing) and uniform at least in the 25°–80° C. operating range, and secondly that the ratio of dynamic to static moduli, which is indicative of the noise transmitting property, should remain relatively low. It is to achieving this balance of properties that this invention is directed.

Various rubber compositions have been proposed for engine mount applications. Most commonly, blends of natural rubber with halogenated rubber, e.g. brominated butyl rubber, have been used. Natural rubber is a good noise transmission insulator but a poor vibration damper. Bromobutyl rubber is, on the other hand, a poor noise insulator while it has good vibration damping qualities. The above blends are, therefore, a compromise between these two properties.

Vibration damping is usually considered to be the primary function of engine mounts and noise insulation the secondary function.

DESCRIPTION OF THE PRIOR ART

Japanese patent application No. 83-213042 as shown in Chemical Abstracts 1984, Vol. 100, entry 122598e discloses vibration damper-sound insulator rubber compositions consisting of vulcanizates of 40 to 100 parts by weight of diene rubber grafted with 0.001-10 parts of unsaturated dicarboxylic acid or anhydride, 0-60 parts of other rubber, 5-60 parts of carbon black and optionally 3-10 parts of metal oxides or 5-50 parts of carboxy-terminated liquid rubber.

U.S. Pat. No. 4,391,942 teaches vibrationinsulating rubber compositions comprising 45 to 75 parts by weight of at least one rubber selected from the group consisting of natural rubber, isoprene rubber, butadiene rubber and styrene-butadiene rubber, 20 to 40 parts by weight of halogenated butyl rubber and 5 to 15 parts by weight of a high-styrene-content copolymer.

Japanese patent application No. 84-01545 as shown in Chemical Abstracts, 1984, Vol. 100, entry 158039n teaches vibration insulating compositions comprising a rubber component containing not less than 20% of emulsion polymerized butadiene-styrene copolymer of combined styrene content 30-50%.

Japanese patent application No. 84-187039 as shown in Chemical Abstracts 1985, Vol. 102, entry 133389e discloses vibration dampers which contain 50-95 parts by weight of natural or diene rubber and 5-50 parts by weight of a diene-unsaturated acid-comonomer polymer.

All the above are aimed at solving the common problem pertinent to engine mounts made of rubber, i.e. to improve the vibration damping property at higher operating temperatures.

The objective of the present invention is to provide rubber compositions which have improved vibration damping without significant loss in noise insulating properties and which have a relatively uniform vibration damping property over a relatively broad temperature range, especially the temperature range that corresponds to the working conditions prevailing in the engine compartment of a vehicle.

SUMMARY OF THE INVENTION

Our research work on ionic crosslinking of some carboxylated rubbers has led to the development of rubber compositions comprising at least one base rubber and at least one carboxylated rubber. The compositions also comprise carbon black, extender oil and metal oxides. Commonly known vulcanization agents are used for curing of the compositions. When cured, the vulcanizates exhibit improved vibration damping characteristics without significant loss in noise insulating properties.

Accordingly, our invention provides a vibration and noise insulating rubber composition comprising:

about 65 to about 97 parts by weight of at least one rubber selected from the first group consisting of natural rubber, isoprene rubber, butadiene rubber and styrene-butadiene rubbery polymer, about 3 to about 35 parts by weight of at least one carboxylated rubber selected from the second group consisting of carboxylated styrene-butadiene rubber, carboxylated butadiene rubber, carboxylated isoprene rubber and carboxylated natural rubber, about 20 to about 60 parts by weight per 100 parts by weight of the total of the above rubbers of at least one carbon black, about 3 to about 25 parts by weight per 100 parts by weight of the total of the above rubbers of extender oil, about 1 to about 10 parts by weight per 100 parts by weight of the total of the above rubbers of at least one metal oxide selected from the group consisting of zinc oxide, zinc peroxide, magnesium oxide and calcium oxide, and vulcanization agents.

The at least one rubber selected from the first group may also be mixed with brominated butyl rubber such that it contains up to about 42 parts by weight of brominated butyl rubber.

Conventional vulcanization agents include the well known sulphur based and peroxidic curatives and accelerators. Antioxidants and/or antiozonants may also be added to the compounds.

The term "carboxylated rubber" as used in this specification denotes a rubber that contains copolymerized or terpolymerized carboxylic acidic monomer, such as methacrylic acid, acrylic acid, itaconic acid, maleic acid, maleic anhydride and the like, or a rubber that has been chemically modified by reaction with carboxylic acidic monomer.

DESCRIPTION OF PREFERRED EMBODIMENTS OF THE INVENTION

The two basic characteristics of an engine mount are vibration damping and noise transmission insulation. The damping coefficient, also known as tan delta, was measured at 11 Hz. The noise insulation was determined by the ratio of dynamic storage modulus at 110 Hz to dynamic storage modulus at 3.5 Hz. A Rheovibron was used to measure these properties. Unless otherwise specified, the test procedures used were all standard ASTM test methods and all contents are parts by weight.

Preferred compositions can be grouped into three categories. A first preferred composition comprises, for a total of 100 parts by weight of rubber, about 65 to about 97 parts by weight of a mixture of from about 25 to about 75 parts by weight of natural rubber and from about 22 to about 40 parts by weight of brominated butyl rubber, and from about 3 to about 35 parts by weight of at least one carboxylated rubber, and most preferably the composition comprises, for a total of 100 parts by weight of rubber, from about 90 to about 97 parts by weight of a mixture of from about 50 to about 67 parts by weight of natural rubber and from about 30 to about 40 parts by weight of brominated butyl rubber, and from about 3 to about 10 parts by weight of carboxylated styrene-butadiene rubber. By brominated butyl rubber is meant a brominated isobutylene-isoprene polymer containing from about 93.9 to about 97 weight per cent of isobutylene, from about 1.5 to about 3.1 weight per cent of isoprene and from about 1.5 to about 3 weight per cent of bromine. By carboxylated styrene-butadiene rubber is meant a polymer containing from about 15 to about 40 weight per cent of styrene, from about 2 to about 10 parts by weight of any one of acrylic acid, methacrylic acid, itaconic acid or maleic acid, the balance being butadiene.

A second preferred composition comprises, for a total of 100 parts by weight of rubber, from about 55 to about 97 parts by weight of butadiene rubber or styrene-butadiene rubbery polymer and from 0 to about 42 parts by weight of one of natural rubber, isoprene rubber or brominated butyl rubber, for a total of from about 65 to about 97 parts by weight of said rubbers, and from about 3 to about 35 parts by weight of at least one carboxylated rubber and most preferably the composition comprises, for a total of 100 parts by weight of rubber, from about 55 to about 97 parts by weight of butadiene rubber or styrene-butadiene rubbery polymer and from 0 to about 42 parts by weight of one of natural rubber, isoprene rubber or brominated butyl rubber, for a total of from about 85 to about 97 parts by weight of said rubbers, and from about 3 to about 15 parts by weight of one of carboxylated styrene-butadiene rubber or carboxylated butadiene rubber. By butadiene rubber is meant a homopolymer of butadiene having a 1,4-content of from about 80 to about 99 per cent and most preferably having a cis-1,4 content of from about 93 to about 99 per cent. By styrene-butadiene rubbery polymer is meant a copolymer of butadiene and styrene containing from about 10 to about 40 weight per cent of styrene and the balance butadiene, in which the butadiene portion of the copolymer has a 1,4-content of from about 80 to about 99 per cent. By isoprene rubber is meant a homopolymer of isoprene having a cis-1,4 content of from about 90 to about 99 per cent. By carboxylated butadiene rubber is meant a polymer containing from about 90 to about 98 weight per cent of butadiene and from about 2 to about 10 weight per cent of any one of acrylic acid, methacrylic acid, itaconic acid or maleic acid.

A third preferred composition comprises from about 65 to about 97 parts by weight of natural rubber and from about 3 to about 35 parts by weight of at least one carboxylated rubber and most preferably the composition comprises from about 75 to about 97 parts by weight of natural rubber and from about 3 to about 25 parts by weight of one of carboxylated isoprene rubber or carboxylated natural rubber. By carboxylated isoprene rubber is meant a polymer containing from about 90 to about 98 weight per cent of isoprene and from about 2 to about 10 weight per cent of any one of acrylic acid, methacrylic acid, itaconic acid or maleic acid. By carboxylated natural rubber is meant natural rubber modified by reaction with, per 100 parts by weight of natural rubber, from about 2 to about 10 parts by weight of maleic acid or maleic anhydride, such reaction being in the solution phase or in the solid phase such as by reaction on a rubber mill or in an internal mixer.

It has also been found that carboxylated butadiene-acrylonitrile rubber may be used as part of or all of the carboxylated rubber in those compositions which contain brominated butyl rubber as one component; in such cases the amount of carboxylated butadiene-acrylonitrile rubber would be from about 3 to about 10 parts by weight.

The invention is illustrated by the following non-limiting examples in which the vulcanization systems comprised sulphur and various well known accelerators. The materials used were:

Natural rubber (NR)—commercial product coded as SMR-60.
Butadiene rubber (BR)—commercial product sold as TAKTENE ® 1220.
Brominated butyl rubber (BIIR)—commercial product sold as POLYSAR ® Bromobutyl X2.
Carboxylated styrene-butadiene rubber (XSBR)—experimental products prepared by emulsion polymerization of styrene, butadiene and methacrylic acid and contains 19.3 weight per cent of styrene and has an acid content of 0.45 milliequivalents per gram.
Carboxylated butadiene rubber (XBR)—experimental product prepared by emulsion polymerization of butadiene and methacrylic acid - contains 0.67 milliequivalents of acid per gram.
Carboxylated butadiene-acrylonitrile rubber (XNBR)—commercial product sold as KRYNAC ® 221.
Carboxylated isoprene rubber (XIR)—experimental product produced by emulsion polymerization of isoprene and methacrylic acid—contains 1.54 milliequivalents of acid per gram.
Carboxylated natural rubber (XNR)—experimental product produced by reaction on a rubber mill of 100 parts of NR and 5 parts of maleic anhydride.
Octamine—antioxidant-diphenylamine-di-isobutylene reaction product.
TMTD—accelerator—tetramethyl thiuram disulphide.
CBS—accelerator—N-cyclohexyl-2-benzothiazole sulphenamide.
Santocure NS—accelerator—N-tert-butyl-2-benzothiazole sulphenamide.
Carbon black—commercial product N660 type.
Oil—commercial product sold as Sunthene 422.

EXAMPLE 1

Sample 1, a control, comprised a blend of 65% natural rubber and 35% of BIIR. The test samples contained XSBR or XNBR substituted for at least part of the NR. Table I shows the recipes and physical properties of the samples.

TABLE I

|  | SAMPLE | | | |
| --- | --- | --- | --- | --- |
|  | 1 | 2 | 3 | 4 |
| NR | 65 | 60 | 60 | 30 |
| BIIR | 35 | 35 | 35 | 40 |
| XSBR | — | 5 | — | 30 |
| XNBR | — | — | 5 | — |
| Carbon black | 30 | 30 | 30 | 30 |
| Oil | 5 | 5 | 5 | 15 |
| Stearic acid | 1 | 1 | 1 | 1 |
| Octamine | 0.5 | 0.5 | 0.5 | 0.5 |
| Zinc oxide | 5 | 5 | 5 | 6 |
| Sulphur | 0.2 | 0.2 | 0.2 | 0.2 |
| TMTD | 0.5 | 0.5 | 0.5 | 0.5 |
| CBS | 2 | 2 | 2 | 2 |
| Cure time, min. | 6 | 7 | 6 | 13 |
| Cure temp., °C. | 160 | 160 | 165 | 160 |
| E'(110 Hz)/E'(3.5 Hz) | 1.39 | 1.52 | 1.54 | 1.55 |
| Tan delta (11 Hz, 25° C.) | 0.17 | 0.19 | 0.21 | 0.19 |
| Tan delta (11 Hz, 50° C.) | 0.12 | 0.15 | 0.14 | 0.15 |
| Tan delta (11 Hz, 80° C.) | 0.11 | 0.14 | 0.14 | 0.19 |
| Hardness, Shore A | 42 | 41 | 43 | 51 |
| Tensile strength (MPa) | 10.0 | 12.3 | 7.0 | 14.7 |
| Elongation (%) | 550 | 630 | 510 | 650 |

The control sample represents the properties of a prior art composition. Samples 2, 3 and 4 exhibit better vibration damping properties than the control as shown by the higher tan delta and less variation with temperature.

EXAMPLE 2

This example compares the control, Sample 5, with other compositions according to the invention which clearly show improved vibration damping, the data being given in Table II.

TABLE II

|  | SAMPLE | | | | |
| --- | --- | --- | --- | --- | --- |
|  | 5 | 6 | 7 | 8 | 9 |
| BR | 100 | 95 | 90 | 80 | 60 |
| XSBR | — | 5 | — | — | 5 |
| XBR | — | — | 10 | 10 | — |
| NR | — | — | — | 10 | — |
| BIIR | — | — | — | — | 35 |
| Carbon black | 30 | 30 | 30 | 30 | 30 |
| Oil | 5 | 5 | 5 | 5 | 5 |
| Stearic acid | 1 | 1 | 1 | 1 | 1 |
| Octamine | 0.5 | 0.5 | 0.5 | 0.5 | 0.5 |
| Zinc oxide | 5 | 5 | 5 | 5 | 5 |
| Sulphur | 0.2 | 0.2 | 0.2 | 0.2 | 0.2 |
| TMTD | 0.5 | 0.5 | 0.5 | 0.5 | 0.5 |
| CBS | 2 | 2 | 2 | 2 | 2 |
| Cure time, min. | 10 | 10 | 10 | 10 | 10 |
| Cure temp., °C. | 165 | 165 | 165 | 165 | 165 |
| E'(110 Hz)/E'(3.5 Hz) | 1.35 | 1.43 | 1.56 | 1.48 | 1.50 |
| Tan delta (11 Hz, 25° C.) | 0.13 | 0.15 | 0.17 | 0.18 | 0.17 |
| Tan delta (11 Hz, 50° C.) | 0.12 | 0.14 | 0.16 | 0.16 | 0.13 |
| Tan delta (11 Hz, 80° C.) | 0.11 | 0.13 | 0.16 | 0.16 | 0.12 |
| Hardness, Shore A | 51 | 49 | 47 | 47 | 51 |
| Tensile strength (MPa) | 8.0 | 7.4 | 7.0 | 7.5 | 10.3 |
| Elongation at break (%) | 440 | 420 | 410 | 420 | 550 |

EXAMPLE 3

The compositions prepared in this example comprised blends of natural rubber and carboxylated polyisoprene or carboxylated NR. Table III shows the recipes. Sample 10 is a control and Samples 11, 12 and 13 exhibit improved vibration damping with only a slight decrease in the noise insulation properties.

TABLE III

|  | SAMPLE | | | |
| --- | --- | --- | --- | --- |
|  | 10 | 11 | 12 | 13 |
| NR | 100 | 90 | 90 | 80 |
| XIR | — | 10 | — | — |
| XNR | — | — | 10 | 20 |
| Carbon black | 30 | 30 | 30 | 30 |
| Oil | 5 | 5 | 5 | 5 |
| Octamine | 0.5 | 0.5 | 0.5 | 0.5 |
| Stearic acid | 1 | 1 | 1 | 1 |
| Zinc oxide | 5 | 5 | 5 | 5 |
| Sulphur | 0.2 | 0.2 | 0.2 | 0.2 |
| TMTD | 0.5 | 0.5 | 0.5 | 0.5 |
| Santocure NS | 2 | 2 | 2 | 2 |
| Cure time, min. | 7 | 6 | 7 | 7 |
| Cure temp., °C. | 166 | 166 | 166 | 166 |
| E'(110 Hz)/E'(3.5 Hz) | 1.32 | 1.40 | 1.38 | 1.41 |
| Tan delta (11 Hz, 25° C.) | 0.10 | 0.12 | 0.13 | 0.13 |
| Tan delta (11 Hz, 50° C.) | 0.09 | 0.13 | 0.13 | 0.13 |
| Tan delta (11 Hz, 80° C.) | 0.09 | 0.15 | 0.12 | 0.13 |
| Hardness, Shore A | 43 | 46 | 39 | 39 |
| Tensile strength, MPa | 16.5 | 11.5 | 15.2 | 15.0 |
| Elongation (%) | 580 | 540 | 600 | 620 |

What is claimed is:

1. A vibration damping and noise insulating rubber composition having a relatively high and uniform damping coefficient between the temperatures of 25° C. and 80° C., said composition comprising:
    about 65 to about 97 parts by weight of at least one rubber selected from the first group consisting of natural rubber, isoprene rubber, butadiene rubber and styrene-butadiene rubbery polymers,
    about 3 to about 35 parts by weight of at least one carboxylated rubber selected from the second group consisting of carboxylated styrene-butadiene rubber, carboxylated butadiene rubber, carboxylated isoprene rubber and carboxylated natural rubber, for a total of 100 parts by weight of said rubbers,
    about 20 to about 60 parts by weight of carbon black based on 100 parts by weight of the total of the above rubbers,
    about 3 to about 25 parts by weight per 100 parts by weight of the total of the above rubbers of extender oil,
    about 1 to about 10 parts by weight per 100 parts by weight of the total of the above rubbers of at least one metal oxide selected from the group consisting of zinc oxide, zinc peroxide, magnesium oxide and calcium oxide, and
    vulcanization agents.

2. A rubber composition according to claim 1, wherein said first rubber is mixed with from 0 to about 42 parts by weight of brominated butyl rubber.

3. A rubber composition according to claim 1 comprising from about 55 to about 97 parts by weight of one of butadiene rubber or styrene-butadiene rubbery polymer, from 0 to about 42 parts by weight of one of natural rubber, isoprene rubber or brominated butyl rubber, for a total of from about 85 to about 97 parts by weight of said rubbers, and 3 to 15 parts by weight of one of carboxylated styrene-butadiene rubber or carboxylated butadiene rubber.

4. A rubber composition according to claim 1 comprising from about 90 to about 97 parts by weight of a mixture of from about 50 to about 67 parts by weight of natural rubber and from about 30 to about 40 parts by weight of brominated butyl rubber, and from about 3 to about 10 parts by weight of carboxylated styrene-butadiene rubber.

5. A rubber composition according to claim 1 comprising from about 75 to about 97 parts by weight of natural rubber and from about 3 to about 25 parts by weight of one of carboxylated isoprene rubber or carboxylated natural rubber.

* * * * *